Figure 3:
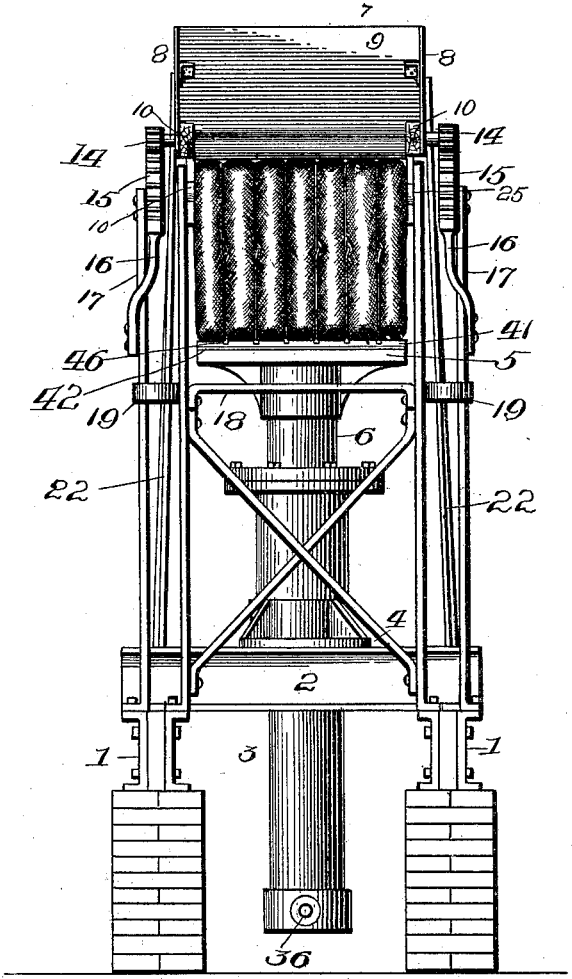

No. 705,135. Patented July 22, 1902.
F. B. POPE & G. D. MIMS.
APPARATUS FOR MAKING CUBIC OR SQUARE BALES, &c.
(Application filed Oct. 14, 1899.)
(No Model.) 8 Sheets—Sheet 1.
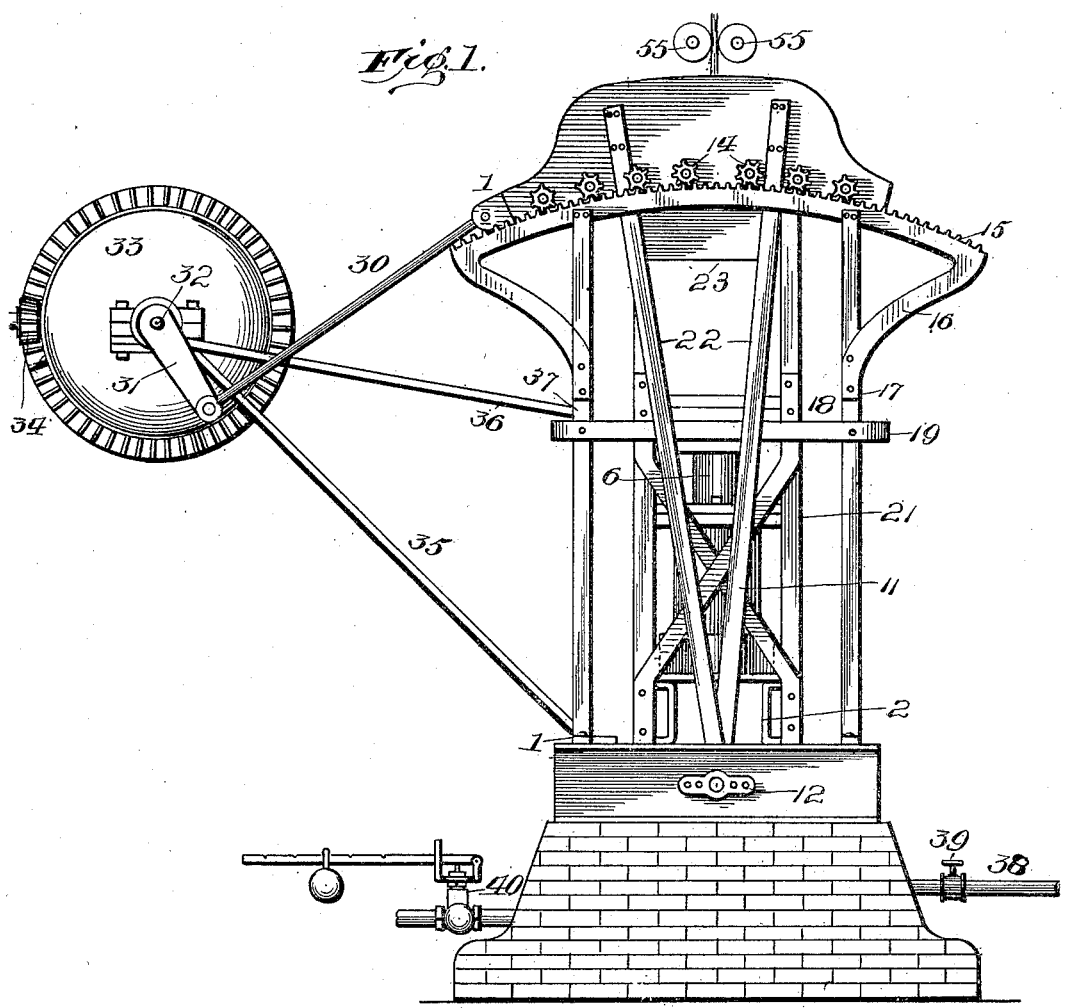
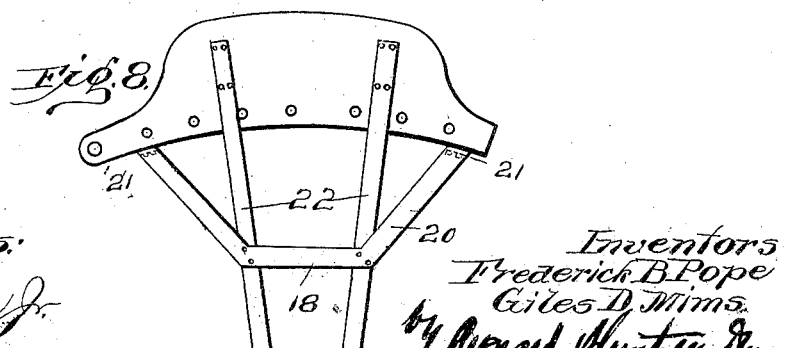
Witnesses:
J. M. Fowler Jr.
M. A. McLeod.
Inventors
Frederick B. Pope
Giles D. Mims.
by Richard (illegible)
Attorney No. 705,135. Patented July 22, 1902.
F. B. POPE & G. D. MIMS.
APPARATUS FOR MAKING CUBIC OR SQUARE BALES, &c.
(Application filed Oct. 14, 1899.)
(No Model.) 8 Sheets—Sheet 2.
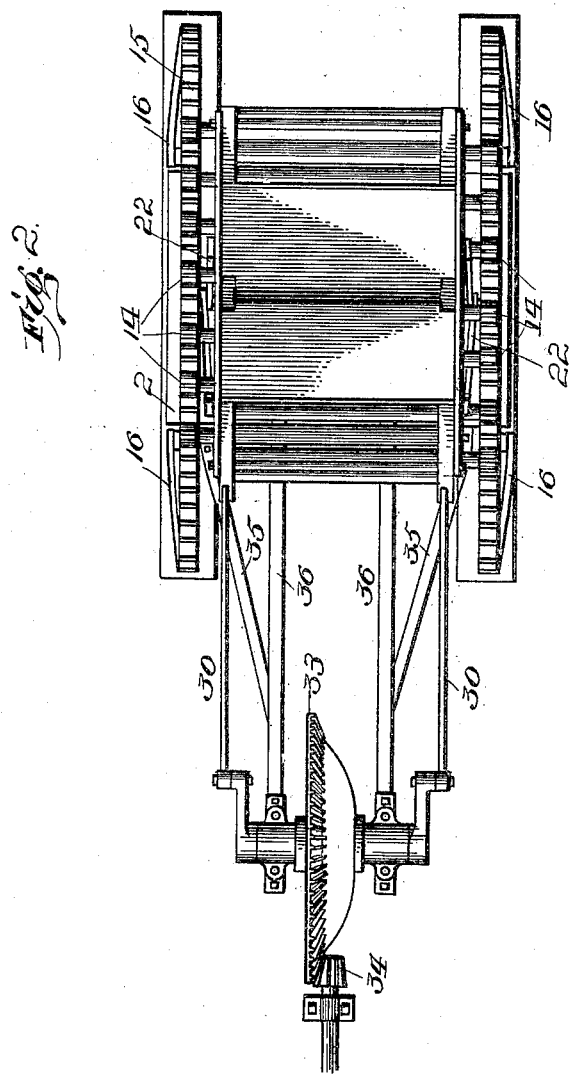

No. 705,135. Patented July 22, 1902.
F. B. POPE & G. D. MIMS.
APPARATUS FOR MAKING CUBIC OR SQUARE BALES, &c.
(Application filed Oct. 14, 1899.)

(No Model.) 8 Sheets—Sheet 3.

Witnesses:
J. M. Fowler Jr.
M. A. McLeod

Inventors
Frederick B. Pope
Giles D. Mims
by Renaud Lumpkin Pope
Attorney

No. 705,135. Patented July 22, 1902.
F. B. POPE & G. D. MIMS.
APPARATUS FOR MAKING CUBIC OR SQUARE BALES, &c.
(Application filed Oct. 14, 1899.)

(No Model.) 8 Sheets—Sheet 4.

Witnesses:
J. M. Fowler Jr.
M. A. McLeod.

Inventors:
Frederick B. Pope
Giles D. Mims
Attorney.

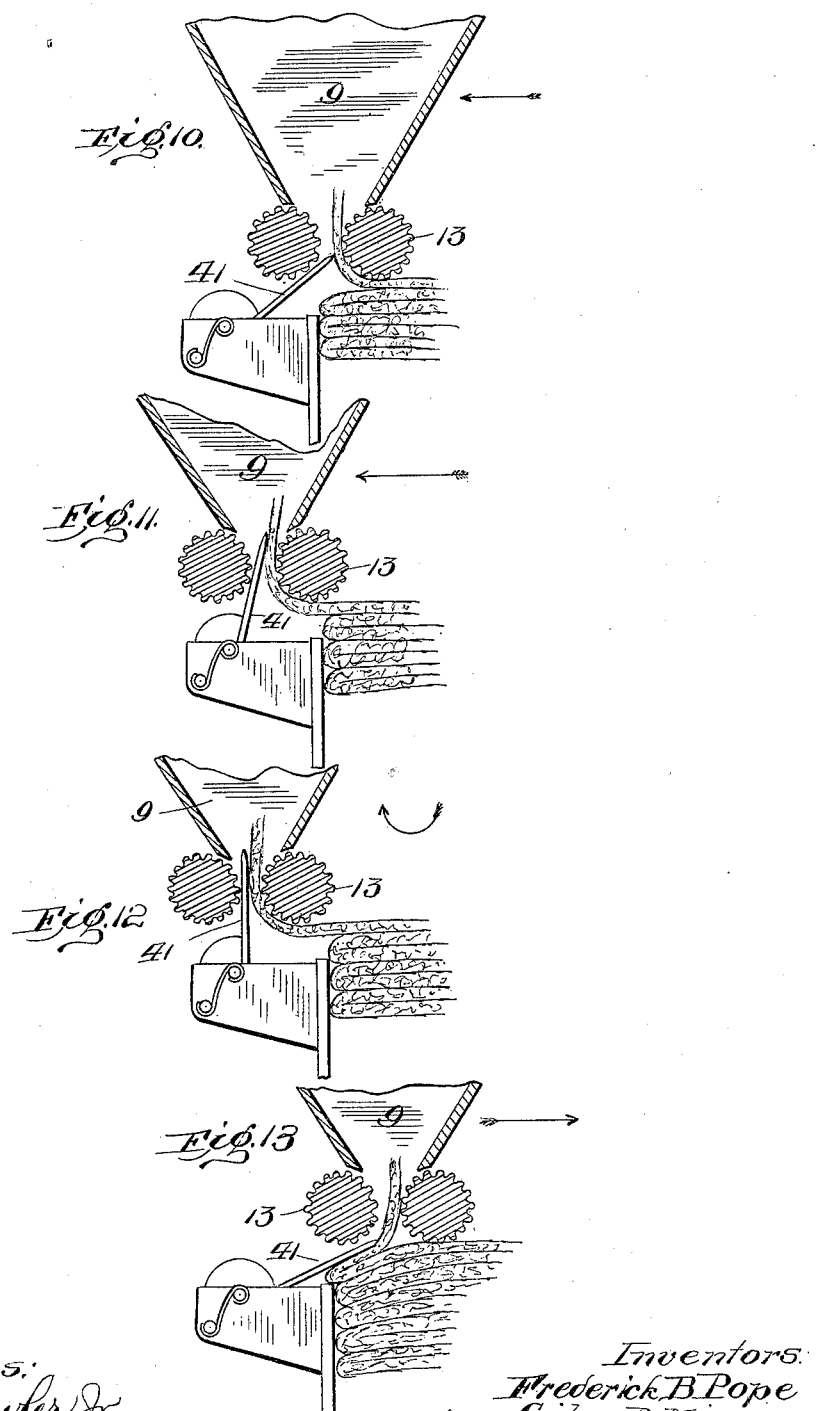

No. 705,135. Patented July 22, 1902.
F. B. POPE & G. D. MIMS.
APPARATUS FOR MAKING CUBIC OR SQUARE BALES, &c.
(Application filed Oct. 14, 1899.)
(No Model.) 8 Sheets—Sheet 6.
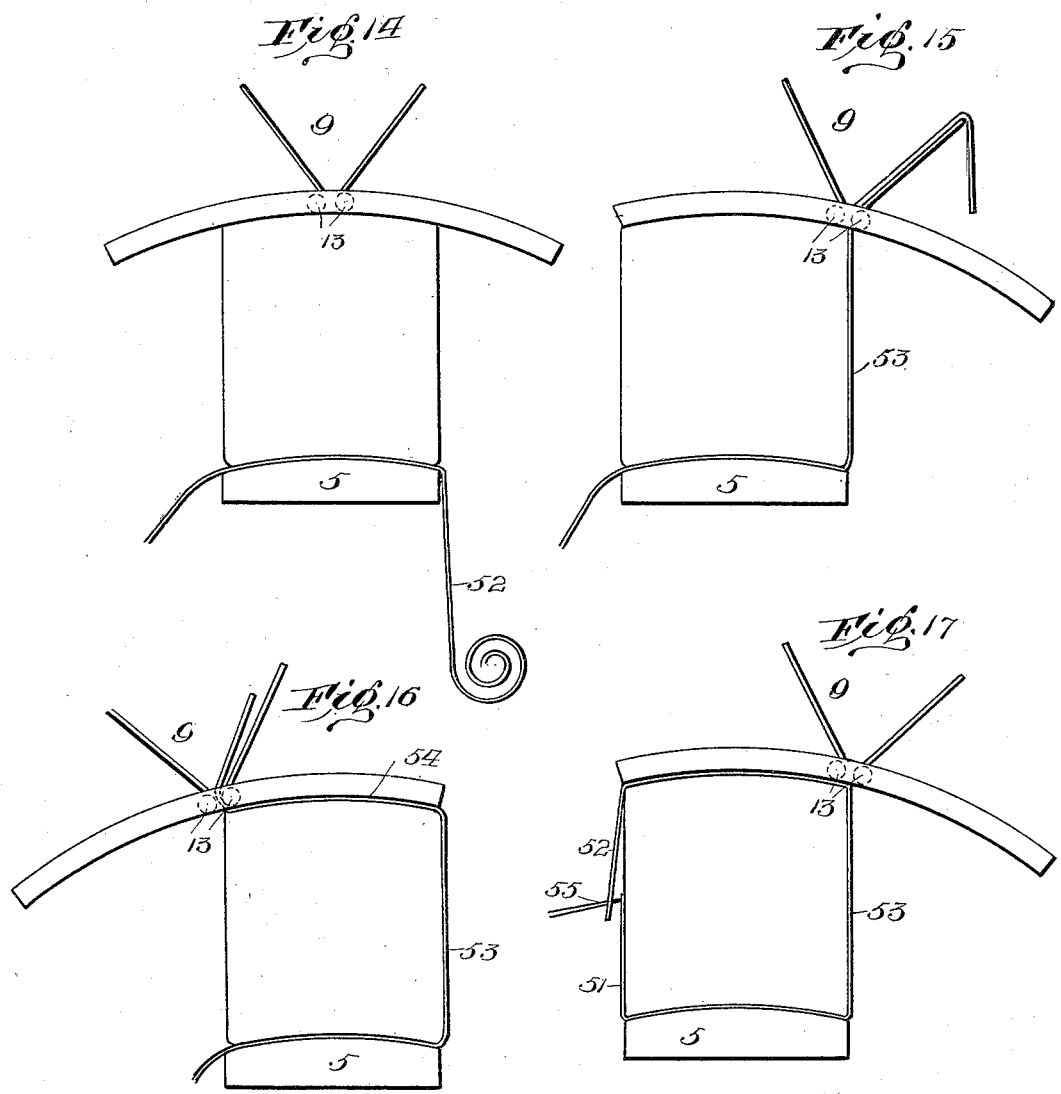

No. 705,135. Patented July 22, 1902.
F. B. POPE & G. D. MIMS.
APPARATUS FOR MAKING CUBIC OR SQUARE BALES, &c.
(Application filed Oct. 14, 1899.)
(No Model.) 8 Sheets—Sheet 7.

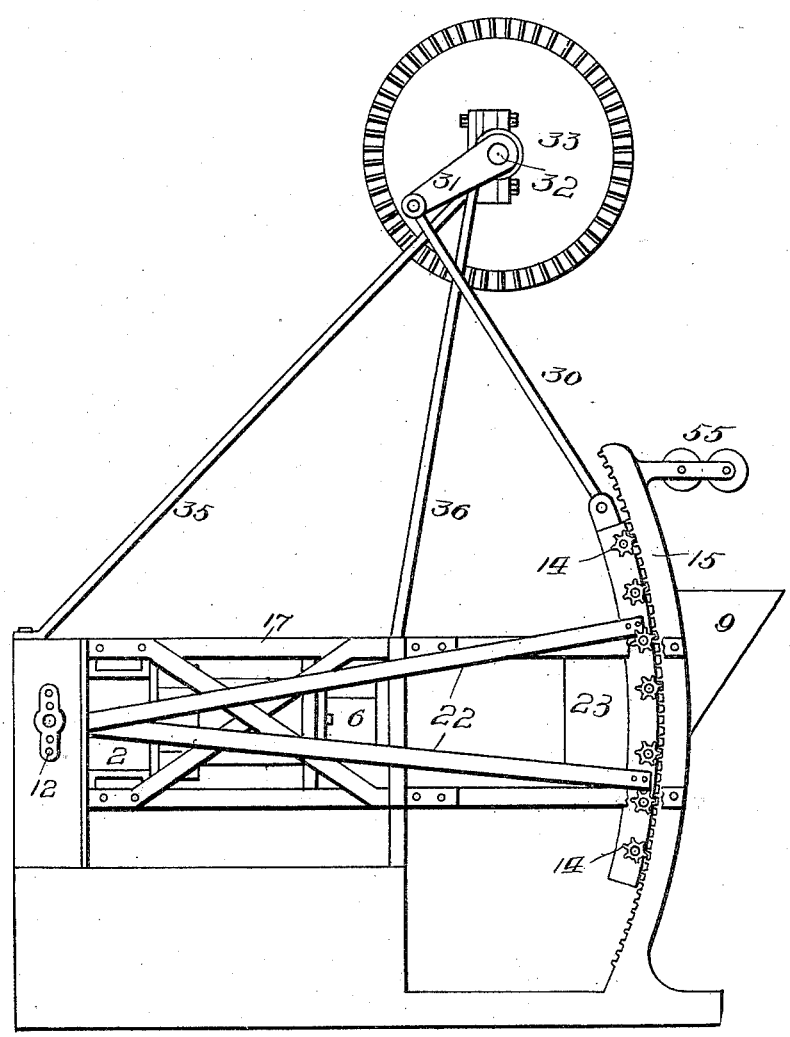

United States Patent Office.

FREDERICK B. POPE, OF AUGUSTA, GEORGIA, AND GILES D. MIMS, OF PARKSVILLE, SOUTH CAROLINA; SAID MIMS ASSIGNOR TO SAID POPE.

APPARATUS FOR MAKING CUBIC OR SQUARE BALES, &c.

SPECIFICATION forming part of Letters Patent No. 705,135, dated July 22, 1902.

Application filed October 14, 1899. Serial No. 733,590. (No model.)

*To all whom it may concern:*

Be it known that we, FREDERICK B. POPE, residing at Augusta, in the county of Richmond and State of Georgia, and GILES D. MIMS, residing at Parksville, in the county of Edgefield and State of South Carolina, citizens of the United States, have invented a certain new and useful Apparatus for Making Rectangular Bales of Elastic and Yieldable Material of High Density; and we do hereby declare the following to be a full, clear, and exact description of the invention, which will enable others skilled in the art to which it appertains to make and use the same.

Our invention relates to apparatus for making rectangular bales of elastic and yieldable material of high density.

Our invention relates to machinery for making rectangular bales of great density by compressing a mass of flexible or yieldable material under great pressure between two surfaces of curved shape. The resulting bale is formed with flat sides and straight corners.

This invention relates more particularly to means for baling cotton which for the purpose of this invention is presumed to have been preliminarily formed in a bat or blanket with the greater portion of the air excluded therefrom.

This invention is not to be understood, however, as being exclusively limited to means for baling cotton or other fibers, as it may be used as well in connection with any other form of flexible or yieldable material, such as hay, cloth, paper, or hides.

The invention is, however, limited to means for making rectangular bales of high density. By "high density" we mean that degree of compression which in the art to which the substance of the bale relates is considered as being high in contradistinction to being low. In the art of cotton-baling, for instance, any density over twenty-eight or thirty pounds to the cubic foot is considered as being high. Baling under high densities requires different methods and modes of procedure than baling under low densities, and the resulting bale is quite different.

In our invention means are provided for compressing the material under great pressure between two curved surfaces, both being curved in the same direction. The resulting bale is irregularly shaped—that is, with convex top and concave bottom and straight parallel sides and ends—until secured by ties and released from external pressure, when it immediately assumes a permanently rectangular form. If the embracing surfaces were flat, the bale upon being hooped and released from their embrace would assume a shape other than rectangular.

We have observed that all bales that are initially formed square under great pressure between flat surfaces always assume a form other than rectangular. We have found that if the mass of material is confined between two surfaces of curved shape, both being curved in the same direction, the bale does not have such a tendency to assume a form other than rectangular. Upon the bale being hooped and the external pressure transferred from two opposite sides to four sides, at least, of the six the bale will be confined at its periphery and the confining strain equally distributed thereover. The peripherally-constrained mass will tend to assume a form whereby the bulk will increase with a constant extent of periphery, the concave bottom will become flat, and the convex top will assume the same shape. The resulting bale will be rectangular and of greater bulk than when in the press.

All apparatus different from ours for making rectangular bales of high density of elastic or yieldable material have been inoperative to the extent of making bales of high density and of rectangular shape. This we assume to be for the reason that the machine compressed the material between flat or plane surfaces. The bales when bound and released from the embrace of the restraining-surfaces inevitably assumed a form other than rectangular. Furthermore, while being compressed under high pressure the same tendency to assume a form other than rectangular asserted itself, and the pressure was irregularly distributed against the two restraining-surfaces, concentrating toward the centers thereof. The result was that that portion of the bale adjacent to the top thereof was subjected to excessive pressure, which injured the material and subjected the machinery to excessive resistance.

We prefer to employ an apparatus for making rectangular bales, which bales consist of a number of superimposed laps of material, the latter being first reduced to a bat or blanket-like form, with the greater portion of the air excluded therefrom.

The gist of the invention consists in using a baling-platen in combination with a lapping-frame adapted to oscillate across the face of the said platen, the working face of the said platen being curved or of the conformation of an arc of a circle, while the lapping-frame is of similar shape and its path of movement identical. In combination with the lapping-frame and platen are means to permit the platen to be moved away from the path of movement of the lapping-frame and at the same time to interpose an adequate resistance to such movement to permit of the interposed bat or sheet remaining under sufficient compression and to prevent the entrance of air therein. If cotton or similar fiber is to be baled, then means are provided for compressing the sheet or bat before it enters the space between the platen and lapping-frame and to keep it constantly under pressure during such intervals and to prevent the entrance of air therein.

Broadly speaking, the invention consists of a frame within which is carried a baling platform or platen in combination with a lapping-frame adapted to be oscillated across the face of said platen, with means to permit the platen to be moved away from the path of movement of the lapping-frame by the accumulated material and at the same time to interpose an adequate resistance to such movement to permit of the interposed material being sufficiently compressed, and connections between the lapping-frame and the frame of the press, whereby the said lapping-frame will be kept within a fixed path or plane of movement irrespective of the strain brought to bear upon it.

It is immaterial to the invention whether the lapping-frame be below, above, or to one side of the platen, as the operation in either case will be the same.

The lapping-frame is preferably formed of a series of parallel rolls with narrow separating-interstices.

Our invention also relates to means for reducing the friction of the moving parts, and especially to reducing the resistance of the baling and lapping rolls.

The invention also relates to means whereby the complete bale may be easily bound and removed.

The invention further relates to devices whereby the bale may be started without the necessity of introducing the material in mass by hand or "priming," and is thus able to produce a bale of uniform density throughout without matting or caking at any one part of it.

This invention relates, further, to means whereby the rolls may be positively and independently rotated irrespective of their grasp or friction or contact with the material being baled.

The invention relates also to means whereby the bale will be formed with square even edges and also to means whereby the bight or loop of successive layers or laps will not be crowded back from the edges, but will be positively retained and held in position while the succeeding bat or layer is being compressed.

Specifically described, our invention consists of a frame formed of angle-irons supported upon a rigid foundation. The frame is preferably vertical, but may be made horizontal, if necessary. Mounted within the lower part of the frame is a vertical cylinder, the upper portion of the piston of which is attached to and supports a baling-platform, which is of substantially the same size as the base of the finished bale. Located above the baling-platform when the latter is in its most elevated position is a lapping-frame carrying two sets of cylindrical rolls. This frame is supported upon vertical side arms or distance-bars, which are pivoted at a point adjacent to the bottom of the frame of the press. The distance-bars are so arranged that the lapping-frame may be oscillated back and forth across the face of the platen, not in a straight path, but in the path of a segment of a circle. The upper face of the platen or piston is not flat, but is curved to coincide with the path of movement of the roll-frame. The rolls are provided with means for positively rotating them upon the lapping-frame being reciprocated. The means consist of one or two toothed arcs or segments of the same shape as the lapping frame or platen, with which engage the pinions keyed to the rolls or to their supporting-shafts. In order that the rolls may be rotated at the proper speed, the pinions should be of the same pitch diameter as the diameter of the rolls. In the middle of the lapping-frame and between each set of rolls and parallel thereto is arranged a narrow opening. The two adjacent rolls are corrugated or fluted for the purpose of initially seizing and grasping the incoming bat. If desired, two angle-irons may be parallelly arranged adjacent to the opening. A hopper is supported by the lapping-frame and is arranged above these two rolls and empties between them. The rolls for initially pressing the blanket when such preliminary pressure is necessary are arranged upon the same vertical plane as the center of the platen, while the hopper carried upon the lapping-frame is sufficiently wide to present a portion of its opening below the rolls at either extremity of its path of travel. Suitable means are provided to oscillate the lapping-frame across the face of the platen. The platen being elevated and thus brought to bear against the lower face of the rolls, the latter are oscillated back and forth, the material in the meantime being fed into the hopper from the rolls adjacent to the condenser in the form of a tightly-compressed sheet or bat of substantially the same width as the finished bale. The compressed sheet will pass through the opening between the two center rolls and will be grasped or pinched between the top of the platen and the corrugated rolls adjacent to the opening, and thus will be drawn through. In order to assist this action, the top of the platen is preferably covered with some elastic soft rough substance—for instance, a part of the cloth or bagging that is designed to permanently cover the bale, or where such covering is not used then a layer of felt backed by rubber. The cotton will readily stick to the cloth or felt and will require no priming or further assistance in starting. As the lapping-frame travels across the face of the platen the material will be drawn in and rolled tightly against the face thereof. Upon reaching one end of its path the lapping-frame will be drawn back and will lap another layer of material and compress it upon the first. This action will be repeated, the platen gradually receding against a certain predetermined resistance until a bale of sufficient depth has been formed.

In order to properly shape the sides of the bale at its inception, there is provided a rectangular frame adjacent to the lapping-frame of substantially the size and shape of the platen. This frame is formed of movable sides and ends, which may be separated upon the bale being completed.

In order that the bight or loop of the bat shall not be crowded back from the edge by the retrograde movement of the lapping-frame, we make use of the following means: A finger or tongue is mounted in bearings on each end of the frame of the press parallel to the angle-bars and adjacent to the position assumed thereby at the extreme ends of their paths of movement. These tongues are mounted slightly below the plane of the lapping-frame and are provided with means, such as a spring or counterbalance, for normally keeping them elevated. During most of the movement of the lapping-frame they will engage with the rollers or side bars of the frame and assume a horizontal position. Upon the lapping-frame reaching the end of its path of movement to one side the tongue adjacent thereto will be automatically elevated by its spring or counterbalance and will pass through the slot between the two angle-bars, but on the side opposite to which is being formed the bale. When the lapping-frame has reached the extreme path of movement, the tongue or finger will assume a nearly-vertical position. Upon the direction of movement of the lapping-frame being reversed the tongue or finger will again assume a horizontal position and at the same time will grasp the bight of the bat of material, pressing it against the platen or the formed portion of the bale, where it will be held until the next bat or layer is formed. By this means the edges of the bale will be built up squarely at right angles to the platen or face of the bale without the material being crowded back from the edge.

In order that a completed bale may be hooped or wired with facility, parallel shallow grooves are cut across the face of the platen and corresponding grooves are made in the face of one of the center corrugated rolls, it being necessary to provide but one of the rolls with such grooves, as will be explained in the detailed description of the apparatus. The bale may be hooped by introducing the ties through such grooves, and after securing the ends thereof under pressure then by lowering the platen slightly and separating the rectangular frame the bale can be freed from the press and readily ejected by hand or any other means. It is better in practice, however, to lay the hoops or wires within the grooves of the platen and apply the bagging thereto before the bale is started. Upon the bale being completed the lapping-frame can be moved to the extremity of its path of movement and the remainder of the hoops and bagging passed through the slot at the bottom of the hopper from underneath and placed within or outside of the hopper. The lapping-frame being returned to the opposite end of its path, the top of the bale will be covered by bagging and hoops under pressure. The ends of the bagging and hoops can then be returned through the slot and secured to the free ends. The ends of the bale will be covered after it is ejected from the press.

In order to better understand the nature of the invention, attention is called to the accompanying drawings, in which—

Figure 4:
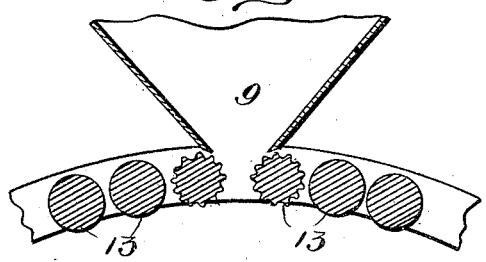
Figure 5:
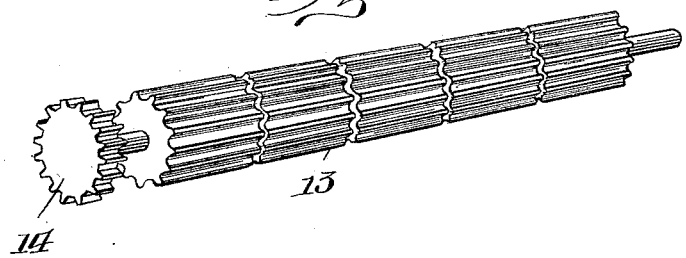
Figure 6:
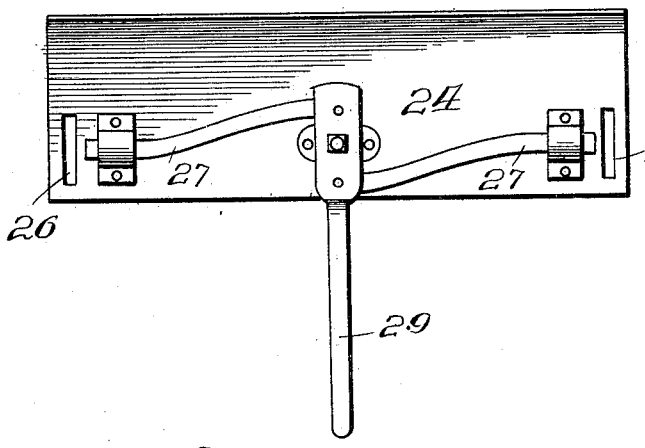
Figure 9:
Figure 18:
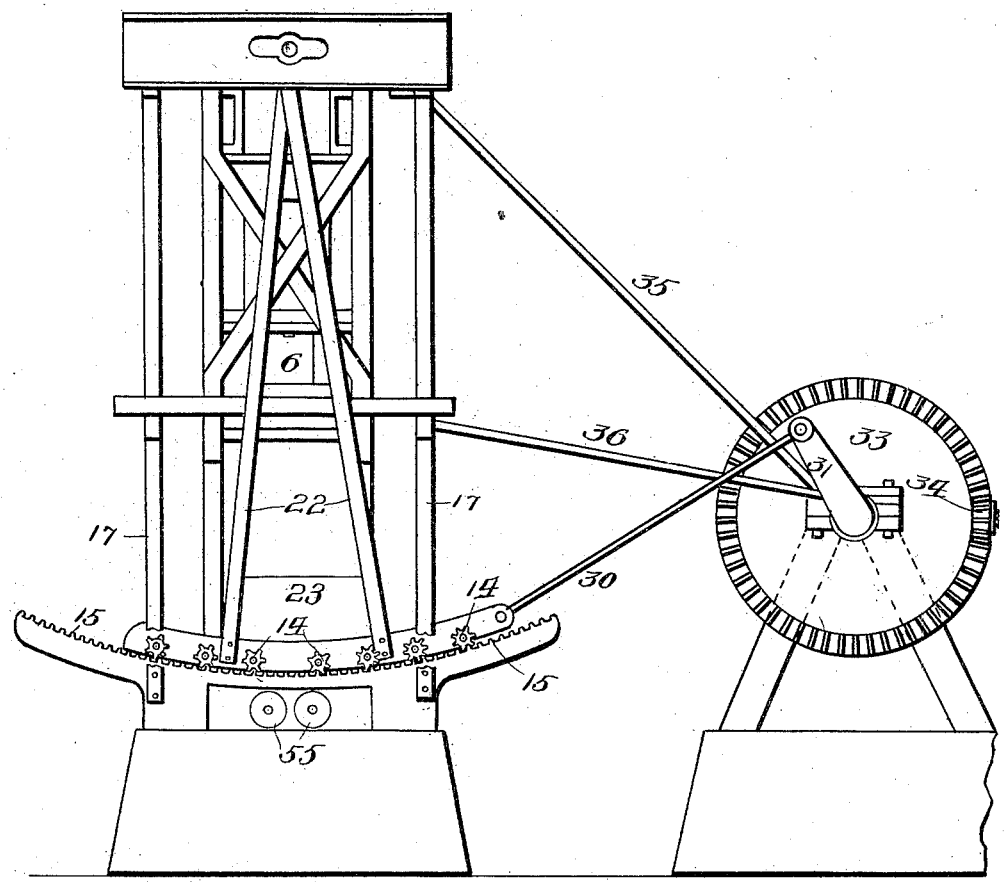

Figure 1 is a side view of the press. Fig. 2 is a top view of the same. Fig. 3 is an end view with a completed bale in the press. Fig. 4 is a section of a portion of the lapping-frame. Fig. 5 is a perspective view of one of the center rolls. Fig. 6 is a front view, and Fig. 7 a side view, of the end gate. Fig. 8 is a modification of the means of attaching the hopper to the distance-bars. Fig. 9 is a modification of the starting-rolls or apex of the hopper. Figs. 10, 11, 12, and 13 are sectional views of the lapping-frame and restraining-finger in different positions. Figs. 14, 15, 16, and 17 are diagrammatical views of a completed bale in the press, showing the different positions of the lapping-frame during the operation of covering and hooping. Fig. 18 is a side view of a press with the forming-platen above the lapping-frame; and Fig. 19 is a similar view of the platen and lapping-frame, the latter moving in a vertical direction.

As is shown more clearly in Figs. 1, 2, and 3, the frame of the press is preferably formed of a combination of angle and bar irons. The base consists of the four parallel channel-irons 1 1, arranged in pairs, as shown, each pair supported upon a permanent foundation.

At right angles to the channels 1 1 and crossing the tops thereof are the channels 2 2. Between the latter and secured to the same is the cylinder 3. A very satisfactory way to secure the cylinder to the frame is to cast or otherwise form a flange or shoulder 4 to the former, which flange will rest upon and be bolted to the upper faces of the channels 2 2. The baling-platform 5 is attached rigidly upon the piston or plunger 6, this latter working freely within the cylinder 3. The piston 6 is sufficiently heavy and rigid as to support the baling-platform 5 without the necessity of auxiliary side supports. Immediately over the baling-platform 5 and so arranged as to be in juxtaposition thereto when the latter is elevated to its utmost extent of movement is the lapping-frame 7. This latter is formed of the two side plates 8 8, extending upward in the middle, as shown, so as to form the sides of the hopper 9. The side plates 8 8 are further strengthened by means of the metal segments 10 10, secured to the side plates upon their inner lower faces, as shown in Fig. 3. These segments 10 serve to support the rolls and angle-bars, as will be described farther on. The baling-platform 5 and lapping-frame 7, which form the two pressing-surfaces, are both curved in the same direction and are preferably parallel, but not necessarily so. The lapping-frame 7 is entirely supported by means of the distance-bars 11 11, which are rigidly secured to the sides of the roll-frame and are pivoted at their other extremities to the channels 1 1. A modification of this structure is shown in Fig. 8. The horizontal bar 18 is provided with upward depending extremities 20, which are riveted or bolted at 21 to the extremities of the hopper. As shown in Fig. 1, each distance-bar 11 is provided with an enlarged head having an opening therein through which the bolt 12 passes, thus forming a bearing therefor. The lapping and pressing rolls 13 are mounted within suitable bearings introduced within the segments 10, as shown in Fig. 3. The two adjacent center rolls are corrugated or fluted, as shown in Fig. 4. The rolls carry upon the extremities of their supporting-axles the gear wheels or pinions 14. It is essential for the proper operation of the press that these gear-wheels be of the same pitch diameter as the diameter of the rolls, as is shown in Fig. 5, and if a gear-wheel were attached to each extremity of each roller they would intermesh and cause juxtaposing rollers to rotate in opposite directions. To avoid this and cause all rolls to rotate in the same direction, the gear-wheels 14 are attached to one end of each roll and are arranged in alternation, as is clearly shown in Fig. 2. These gear-wheels 14 permanently engage with the teeth of the racks or toothed segments 15, one on each side of the frame. The latter are provided with the depending portions or lugs 16, which are bolted or riveted to the middle portions of the legs 17. The lugs 16 are offset, as shown in Fig. 3, so as to bring the working faces of the segments under and in engagement with the gear-wheels 14. The legs or bars 17 are connected together by the horizontal bar 18. In order to allow this bar to pass inside of the distance-bars 11, it is bent or offset at each end at 19. (See Figs. 1 and 3.) The arrangement, consisting of the segment 15, the supporting-legs 17, and the bars 18, forms a very rigid structure. By making the joints of the several parts adjustable any distortion by the springing of the metal or by wear may be taken up.

It is to be understood that the plane of the rolls 10, the working face of the segment 15, and the upper face of the platen 5 are all drawn on radii of circles the centers of which are formed in bearings 12 of the distance-bars 11.

Figure 7:
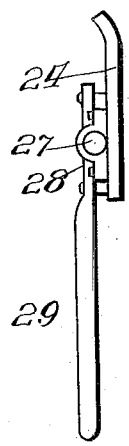

In order that the sides and ends of the bale may be shaped as it is being formed, a skeleton framework is provided for this purpose. A frame is built up from the angles 1 1 2 2 to the level of the baling-platform when the latter is in its lowermost position. This frame is indicated by the numeral 21. At the top are hinged the side bars 22 22, carrying the metal mold-boards 23 thereon. The metal end boards 24, Figs. 6 and 7, are arranged to be secured to the ends of the mold-boards 23 to form a rectangular box without top or bottom. A simple way of securing these together is by providing ears 25 upon the extremities of the boards 23, these ears passing through slots 26, near the extremities of the boards 24. These may be secured in position by means of the bolts 27. A vertical lever 28, pivoted to each end board 24 and connecting with the bolts 27, provides simple and efficient means for simultaneously operating them. A handle 29 to the lever 28 is arranged within convenient reach of the operator. It will be seen that by disengaging the bolts 27 the end boards 24 may be entirely removed, at the same time allowing the side bars 22 to move on their hinges, carrying the mold-boards 23 therewith a sufficient distance to allow the bale to be removed.

As is clearly shown in Fig. 3, the upper edge of the side boards 23 extends beyond the bottoms of the rolls 13. The ends of the latter are squared, which gives a shoulder for the board to bear against, and thus prevents lateral displacement.

Suitable means are provided for oscillating the lapping-frame across the face of the baling-platform. This means, as illustrated, consists of the two pitmen 30, pivoted to one end of the lapping-frame and connected with the cranks 31 on the shaft 32.

Suitable means is provided for rotating the shaft 32, that illustrated consisting of the bevel-gear 33 and pinion 34. The bearing-boxes of the shaft 32 are supported upon a frame 35, which is fastened to the channels 1 1. Auxiliary braces 36 connect the bearing-boxes to the side legs 17 at the point 37, adjacent to the baling-platform, and give a point of support near the bale.

Means are provided for interposing sufficient resistance within the cylinder 3 to the passage of the piston to permit of the proper amount of pressure being applied to the bale. Any form of hydraulic mechanism may be used, that shown being merely for the purpose of illustration. In the device shown the water is introduced through the pipe 38 under sufficient pressure to elevate the platform 5. By closing the valve 39 and so regulating the escape-valve 40 the exit of the water can be controlled, and thus interpose sufficient resistance to the descent of the piston.

The upper face of the platen or baling-platform 5, as is shown in Figs. 14, 15, 16, and 17, is curved in the arc of a circle, which circle is of the same radius as the working lengths of the distance-bars 11.

The plane of the axes of all the rolls contained in the lapping-frame is drawn on the plane of the periphery of a circle the radius of which is equal to the working length of the distance-bars 11 and has, therefore, the same curve as the upper face of the baling-platform 5. By forming both platform and lapping-frame in the same curve, such curve being equal to the periphery of a circle having the same radius as the working length of the distance-bars, the two can be kept in close engagement through the entire path of the oscillatory movement of the lapping-frame.

The upper face of the platform may be covered with a soft elastic material—as, for instance, felt—as shown at 42. This may be backed up by a sheet of rubber. This is for the purpose of assisting the feeding action of the press if cotton is being baled, the cotton readily sticking to the felt and requiring no priming or further assistance in starting.

The operation of the entire device is as follows: The material in the form of a bat or blanket with the greater portion of the air excluded therefrom is allowed to fall from the compressing-rolls 55 into the hopper 9. The baling-platform 5 is elevated by admitting water to the cylinder 3 until the platform presses with the desired degree of force against the faces of the rolls 13. The pinion 34, being put in motion by means of suitable connections, will operate the parts to reciprocate the lapping-frame across the face of the platen. A portion of the covering of the bale is first laid upon the top of the platen, with the corresponding portions of the ties thereunder within the grooves 46. The end of the blanket will gravitate through the slot between the center rolls and will engage with the surface of the platen 5. This portion of the bat will be drawn under one of the corrugated center rolls 13 and will be nipped between this roller and the face of the platform. As the lapping-frame advances the same part of the bat will be successively nipped and pressed against the face of the platen by the following rollers, which are positively rotating, while the additional material will be drawn through the slot to form a continuous sheet. At the end of the movement of the frame it will be retracted, thus doubling the sheet over the one already formed, and will press it against the first sheet by means of the second set of rolls. This action will be repeated as many times as is necessary, the platen 5 slowly retreating against a predetermined resistance. If it is found necessary in the formation of the bale to increase the pressure as the bale enlarges, such may be easily accomplished by adjusting the resistance of the escape-valve 40. As is shown in Fig. 10, the lapping-frame is supposed to be traveling in the direction of the arrow and the center rolls have just come in engagement with the finger and the latter is just about to enter the slot between the two rolls, which it soon does, as shown in Fig. 11. In Fig. 12 the lapping-frame has reached the limit of its movement and the finger is standing vertical or nearly vertical within the slot. The position of the slot is now a short distance beyond the edge of the completed bale or the edge of the end plate 24, which forms a guide for the edge of the bale. Upon the direction of movement of the lapping-frame being reversed the finger or plate 41 will assume a horizontal position and will engage with that portion of the bat between the edge of the bale and the forming-slot, doubling the same back upon itself and firmly holding the bight in position, as is shown in Fig. 13. Upon the lapping-frame reaching the other side of the bale the same maneuver will be repeated with the finger or tongue at that side.

By the above-described means any tendency of the bight of the bat of material to crowd away from the edge of the bale by one of the center rolls or the following roll engaging therewith will be prevented and a square-edge bale will invariably be formed.

Upon the bale reaching a sufficient size it is wired or bound in the following manner, which is shown in Figs. 14 to 17, inclusive: As is shown in Fig. 14, the bale is supposed to be completed. The lapping-frame is moved to the full extent of its travel and the end 52 of the bagging and ties introduced from underneath between the center rolls 13 13 and deposited within the hopper 9 and all slack removed from the portion 53. The lapping-frame is then moved to the position shown in Fig. 16, which will cover the top of the bale at 54. This end 52 of the covering is returned through the slot and secured to the other end 51 by sewing or otherwise. The ends of the ties are secured together by means of any suitable tool, as at 55. The platen is then allowed to drop a few inches, the end boards 24 are removed, and the moldboards 23 allowed to fall outward a short distance. The bale can then be easily ejected and the parts reassembled for the formation of a new bale.

We consider that the rectangular bale of high density possesses many practical advantages over bales of similar shape but of low density and bales of different shape but of high density. Our bale is of a shape approaching that of the low-density bale of commerce. The insurance rate and freight are lower. The tare is the same. In view of these three facts business methods and relations are not disturbed by the introduction of our bale. Our bale possesses advantages in that it may be stored within the holds of vessels with greater facility and with less loss than with the ordinary commercial bale.

Before claiming our invention we wish to define our conception of the term "rectangular" bale. By such terms we do not wish to convey the meaning that our bale is mathematically rectangular, but that it sufficiently approaches the rectangular form to satisfy all commercial purposes and needs.

Having now particularly described and ascertained the nature of our said invention, what we claim as new, and desire to secure by Letters Patent, is—

1. In a press for baling elastic and yieldable material into rectangular bales, means consisting of two curved restraining-surfaces, both being curved in the same direction, between which the bale is compressed.

2. In a press for baling elastic and yieldable material into rectangular bales, means consisting of two restraining, parallel surfaces of curved configuration, between which the bale is compressed.

3. In a press for baling elastic and yieldable material into rectangular bales, means consisting of two restraining, parallel surfaces of curved configuration, between which the bale is compressed, and means for introducing the material between said surfaces.

4. In a press for baling elastic and yieldable material into rectangular bales, two restraining, parallel surfaces of curved configuration, and means for introducing the material between said surfaces through one of said surfaces.

5. In a press for baling elastic and yieldable material into rectangular bales, two restraining, parallel surfaces of curved configuration, and means for oscillating one of said surfaces across the face of the other in a path of movement identical with the path of said surface.

6. In a press for baling elastic and yieldable material into rectangular bales, two restraining parallel surfaces of curved configuration, a pivot, and means for oscillating one of said surfaces upon the pivot across the face of the other in a path of movement identical with the path of said surface, substantially as set forth.

7. In a press for baling elastic and yieldable material into rectangular bales, a curved lapping-frame, a curved baling-platform, parallel thereto, and means for imparting relative oscillatory movement to said lapping-frame and baling-platform.

8. In a press for baling elastic and yieldable material into rectangular bales, a curved lapping-frame, a curved baling-platform, both being curved in the same direction, and means for imparting relative oscillatory movement to said lapping-frame and baling-platform.

9. In a press for baling elastic and yieldable material into rectangular bales, a curved lapping-frame formed of rolls, a curved baling-platform, both being curved in the same direction, and means for imparting relative oscillatory movement to said lapping-frame and baling-platform.

10. In a press for baling elastic and yieldable material into rectangular bales, a curved lapping-frame formed of two series of rolls, a curved baling-platform, both being curved in the same direction, and means for imparting relative oscillatory movement to said lapping-frame and baling-platform.

11. In a press for baling elastic and yieldable material into rectangular bales, a curved lapping-frame, a curved baling-platform, both being curved in the same direction, means for pressing said platform into engagement with said lapping-frame, and means for imparting relative oscillatory movement to said lapping-frame and baling-platform.

12. In a press for baling elastic and yieldable material into rectangular bales, a curved lapping-frame formed of rolls, a curved baling-platform, both being curved in the same direction, means for pressing said platform into engagement with said lapping-frame, and means for imparting relative oscillatory movement to said lapping-frame and baling-platform.

13. In a press for baling elastic and yieldable material into rectangular bales, a curved lapping-frame formed of two series of rolls, a curved baling-platform, both being curved in the same direction, means for pressing said platform into engagement with said lapping-frame, and means for imparting relative oscillatory movement to said lapping-frame and baling-platform.

14. In a press for baling elastic and yieldable material into rectangular bales, a curved lapping-frame, a curved baling-platform, both being curved in the same direction, a hydraulic cylinder for pressing said platform into engagement with said lapping-frame, and means for imparting relative oscillatory movement to said lapping-frame and baling-platform.

15. In a press for baling elastic and yieldable material into rectangular bales, a curved lapping-frame formed of rolls, a curved baling-platform, both being curved in the same direction, a hydraulic cylinder for pressing said platform into engagement with said lapping-frame, and means for imparting relative oscillatory movement to said lapping-frame and baling-platform.

16. In a press for baling elastic and yieldable material into rectangular bales, a curved lapping-frame formed of two series of rolls, a curved baling-platform, both being curved in the same direction, a hydraulic cylinder for pressing said platform into engagement with said lapping-frame, and means for imparting relative oscillatory movement to said lapping-frame and baling-platform.

17. In a press for baling elastic and yieldable material into rectangular bales, a press-frame, a baling-platform supported thereby, said baling-platform having a curved upper face, a curved lapping-frame, and means for oscillating said lapping-frame across the face of the baling-platform in a path parallel thereto, substantially as set forth.

18. In a press for baling elastic and yieldable material into rectangular bales, a press-frame, a baling-platform supported thereby, said baling-platform having a curved upper face, a curved lapping-frame carrying baling means, and means for oscillating said lapping-frame across the face of the said baling-platform in a path parallel thereto, substantially as set forth.

19. In a press for baling elastic and yieldable material into rectangular bales, a press-frame, a baling-platform carried thereby, the working face of said platform being curved, a curved lapping-frame, and means for oscillating said lapping-frame across the face of the said baling-platform in a path parallel thereto, substantially as set forth.

20. In a press for baling elastic and yieldable material into rectangular bales, a press-frame, a baling-platform carried thereby, the working face of said platform being curved, a curved lapping-frame, a series of baling-rolls carried thereby, and means for oscillating said lapping-frame across the face of the said baling-platform in a path parallel thereto, substantially as set forth.

21. In a press for baling elastic and yieldable material into rectangular bales, a press-frame, a pressure-cylinder therein carrying a piston, a baling-platform carried thereon, the said baling-platform having a curved upper face, a curved lapping-frame parallel thereto, and means for imparting oscillatory movement to said baling-platform and lapping-frame, substantially as set forth.

22. In a press for baling elastic and yieldable material into rectangular bales, a press-frame, a pressure-cylinder therein carrying a piston, a baling-platform carried thereon, the said baling-platform having a curved upper face, a curved lapping-frame parallel thereto, a series of rolls carried therein, and means for imparting relative oscillatory movement to said baling-platform and lapping-frame, substantially as set forth.

23. In a press for baling elastic and yieldable material into rectangular bales, a baling-platform, a lapping-frame, distance-bars connected with said lapping-frame and pivoted below said platform, and means for oscillating said lapping-frame across the face of the said baling-platform, substantially as set forth.

24. In a press for baling elastic and yieldable material into rectangular bales, a baling-platform, a lapping-frame, a series of baling-rolls carried thereby, distance-bars connected with said lapping-frame and pivoted below said platform, and means for oscillating said lapping-frame across the face of the said baling-platform, substantially as set forth.

25. In a press for baling elastic and yieldable material into rectangular bales, a press-frame, a pressure-cylinder therein carrying a piston, a baling-platform carried thereon, a lapping-frame and distance-bars connected to said lapping-frame and pivoted to the press-frame adjacent to the cylinder, substantially as set forth.

26. In a press for baling elastic and yieldable material into rectangular bales, a press-frame, a baling-platform supported thereby, the said baling-platform having a curved upper face, a curved lapping-frame, distance-bars connected to said lapping-frame and pivoted to said press-frame, and means for oscillating said lapping-frame across the face of the said baling-platform in a path parallel thereto, substantially as set forth.

27. In a press for baling elastic and yieldable material into rectangular bales, a press-frame, a pressure-cylinder carried therein, carrying a piston, a baling-platform carried thereon, the said baling-platform having a convexly-curved upper face, a curved lapping-frame parallel thereto, and distance-bars connected to said lapping-frame and pivoted to the press-frame adjacent to the cylinder, substantially as set forth.

28. In a press for baling elastic and yieldable material into rectangular bales, a press-frame, a curved baling-platform supported thereby, a curved lapping-frame, a series of baling-rolls carried thereby, means for oscillating said lapping-frame across the face of the said baling-platform in a path parallel thereto, and means for positively rotating said rolls.

29. In a press for baling elastic and yieldable material into rectangular bales, a press-frame, a curved baling-platform supported thereby, a curved lapping-frame, a series of baling-rolls carried thereby, means for oscillating said lapping-frame across the face of the said baling-platform in a path parallel thereto, and connections between said press-frame and rolls for positively rotating the latter.

30. In a press for baling elastic and yieldable material into rectangular bales, a press-frame, a curved baling-platform supported thereby, a curved lapping-frame, a series of baling-rolls carried thereby, means for oscillating said lapping-frame across the face of the said baling-platform in a path parallel thereto, a toothed rack secured to the press-frame, and a series of gears or pinions secured to said rolls and engaging with said racks, whereby the said rolls will be positively rotated.

31. In a press for baling elastic and yieldable material into rectangular bales, a press-frame, a baling-platform supported thereby, a lapping-frame having a slot therein, a tongue on each end of the press-frame and engaging with the lapping-frame, and means for oscillating said lapping-frame across the face of the platform in a path parallel thereto, whereby said slot will alternately engage with each tongue.

32. In a press for baling elastic and yieldable material into rectangular bales, a press-frame, a baling-platform supported thereby, a lapping-frame having a slot therein, a spring-elevated tongue on each end of the press-frame and engaging with the lapping-frame, and means for oscillating said lapping-frame across the face of the said baling-platform in a path parallel thereto, whereby the slot will alternately engage with each tongue.

33. In a press for baling elastic and yieldable material into rectangular bales, a lapping-frame therefor comprising two sets of pressing-rolls, and two parallel angle-bars between the sets, the said angle-bars having their sharp faces toward each other and separated to form a narrow slit between the same, substantially as set forth.

34. In a press for baling elastic and yieldable material into rectangular bales, a lapping-frame therefor comprising two sets of pressing-rolls, and two parallel angle-bars between the sets, the said angle-bars having their sharp faces toward each other and separated to form a narrow slit between the same, and a hopper arranged above the slit, substantially as set forth.

35. In a press for baling elastic and yieldable material into rectangular bales, a press-frame, a baling-platform supported thereby, the said baling-platform having a curved upper face covered with an elastic, rough substance, a curved lapping-frame, distance-bars connected to said lapping-frame and pivoted to said press-frame, and means for oscillating said lapping-frame across the face of the said baling-platform in a path parallel thereto, substantially as set forth.

36. In a press for baling elastic and yieldable material into rectangular bales, a press-frame, a baling-platform supported thereby, the said baling-platform having a curved upper face covered with felt, a curved lapping-frame, distance-bars connected to said lapping-frame and pivoted to said press-frame, and means for oscillating the said lapping-frame across the face of the said baling-platform in a path parallel thereto, substantially as set forth.

37. In a press for baling elastic and yieldable material into rectangular bales, a press-frame, a baling-platform supported thereby, the said baling-platform having a curved upper face, a forming-chamber surrounding said baling-platform and having separable sides and ends, a curved lapping-frame, distance-bars connected to said lapping-frame and pivoted to the press-frame, and means for oscillating said lapping-frame across the face of the said baling-platform in a path parallel thereto, substantially as set forth.

38. In a press for baling elastic and yieldable material into rectangular bales, a press-frame, a baling-platform supported thereby, the said baling-platform having a curved upper face, a curved lapping-frame, distance-bars connected to said lapping-frame and pivoted to the press-frame, pitmen for oscillating the said lapping-frame across the face of the said baling-platform in a path parallel thereto, a crank-shaft connected with said pitmen, supporting-boxes for the crank-shaft, and braces connecting said crank-shaft and the press-frame, adjacent to the lapping-frame, substantially as set forth.

39. In a press, the combination with a press-frame, a lapping-frame carried thereon, said lapping-frame being formed of a continuous series of closely-spaced rolls, with a narrow slot through which the cotton is fed, a pivot on the press-frame for supporting said lapping-frame, means for oscillating the frame on the pivot, a movable platen, and means for interposing an adequate resistance to the receding of the platen to effect the entire compression of the bale in increments as the cotton is fed within the press, and lapped between the lapping-frame and platen, substantially as described.

This specification signed and witnessed this 12th day of October, 1899.

FREDERICK B. POPE.
GILES D. MIMS.

Witnesses:
L. S. DAVIS,
PORTER FLEMING.